Figure 1:
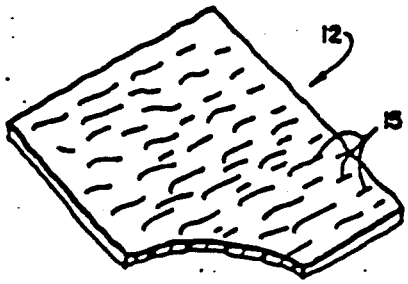
Figure 2:
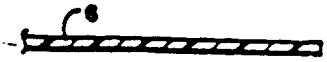
Figure 3:
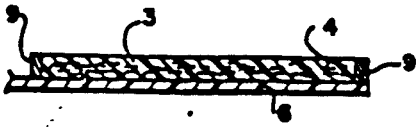
Figure 4:
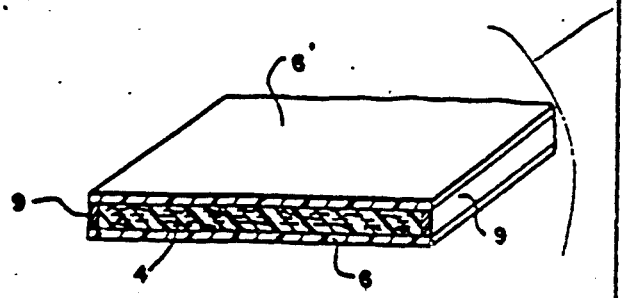
Figure 5:
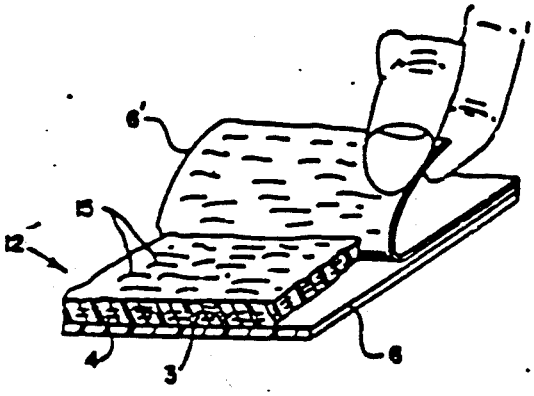

T 856,045

BEST AVAILABLE COPY

DEFENSIVE PUBLICATION

UNITED STATES PATENT OFFICE

Published at the request of the applicant or owner in accordance with the Notice of Apr. 11, 1968, 849 O.G. 1221. Identification is by serial number of the application and the heading indicates the number of pages of specification, including claims, and of sheets of drawing contained in the application as originally filed. The file of this application is available to the public for inspection; reproduction may be purchased for 20 cents per sheet.

Applications published under the Defensive Publication Program have not been examined as to the merits of alleged invention. The Patent Office makes no assertion as to the novelty of the disclosed subject matter.

PUBLISHED NOVEMBER 26, 1968

856 O.G. 1021

T 856,045

669,425

WRINKLED SURFACE AND THE METHOD OF PREPARING SAME

Daniels L. Edwards, Jr., and Parker J. Trent, both c/o Tennessee Eastman Company, P.O. Box 511, Kingsport, Tenn. 37662

Filed Sept. 21, 1967. Published Nov. 26, 1968
Class 161—194
1 Sheet Drawing. 3 Pages Specification

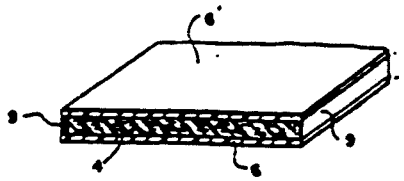

Preparation of re-enforced synthetic resin articles of manufacture having a decorative wrinkled surface by coating a particular polyester film with a layer of liquid, thermosetting resin containing fibrous re-enforcement material, curing the coated film and stripping away the polyester film. The polyester film is the condensation product of terephthalic acid, isophthalic acid and 1,4-cyclohexanedimethanol in a molar ratio of about 5:1:6.

T856045

BEST AVAILABLE COPY

669425

INVENTORS
DANIEL L. EDWARDS JR.
PARKER J. TRENT

BY William J. French
George P. Chandler
ATTORNEYS